Aug. 23, 1938.   J. F. SHEPPARD ET AL   2,127,704
STRIP FEED MECHANISM FOR RECORD MACHINES
Filed April 4, 1935    5 Sheets-Sheet 1
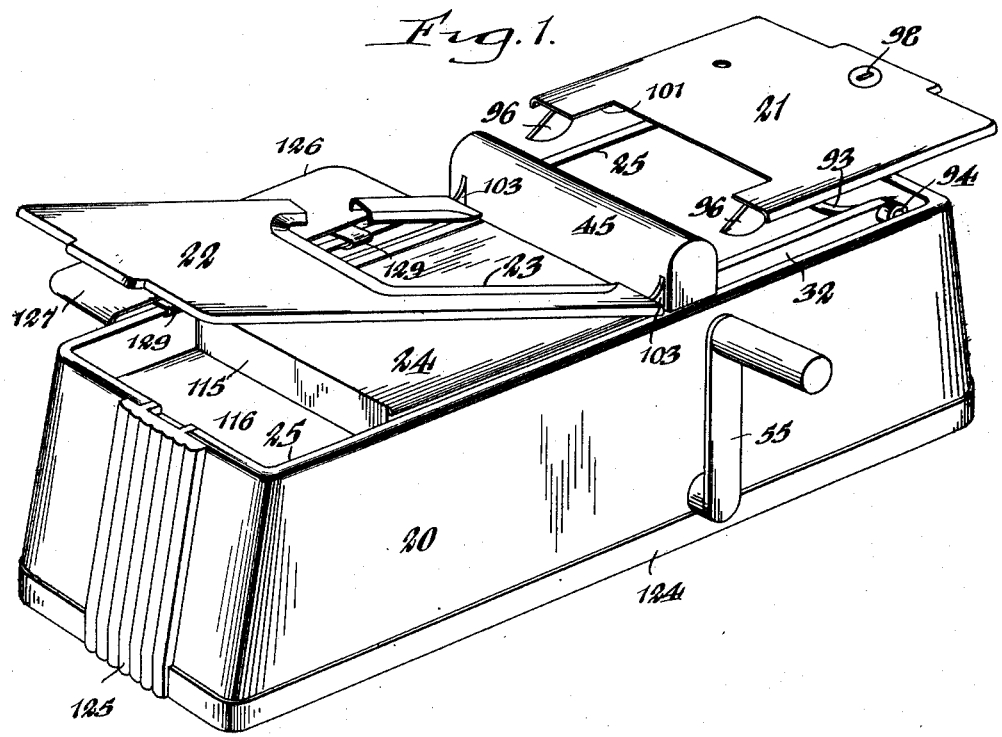
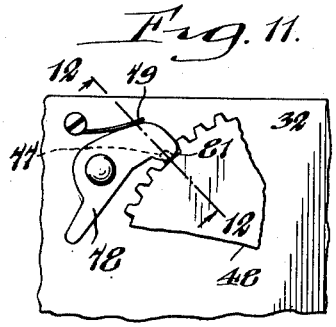
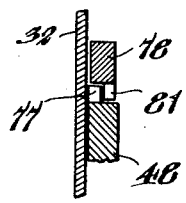
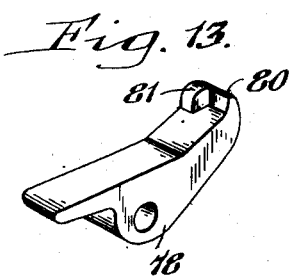
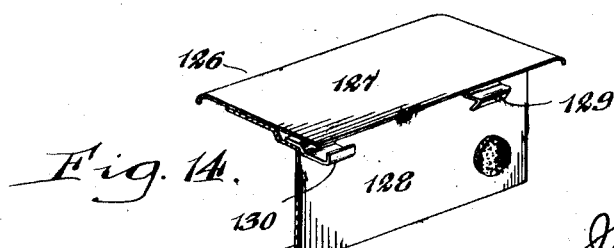

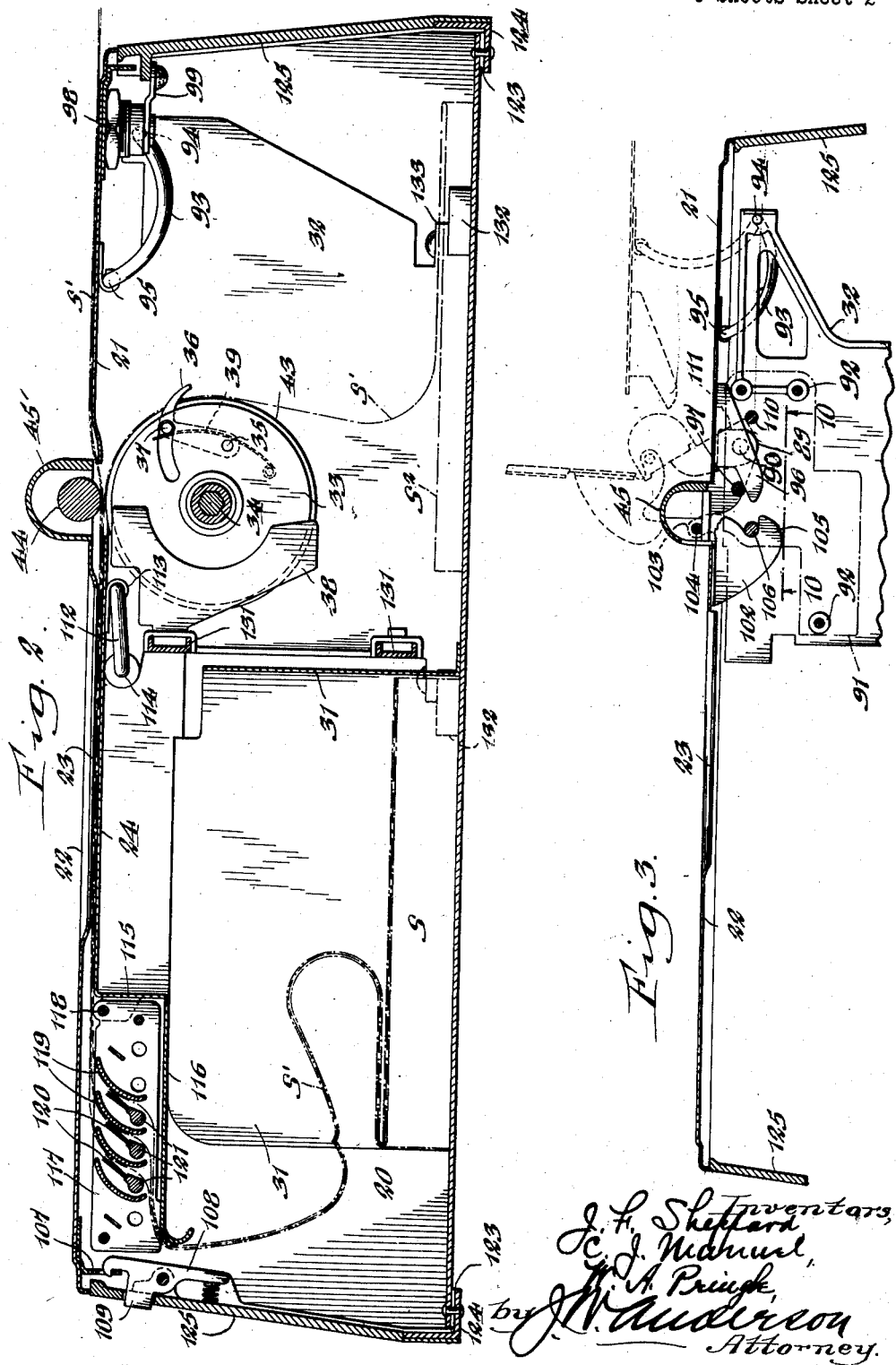

Aug. 23, 1938.   J. F. SHEPPARD ET AL   2,127,704
STRIP FEED MECHANISM FOR RECORD MACHINES
Filed April 4, 1935   5 Sheets-Sheet 3

Inventors,
J. F. Sheppard
C. J. Maund
W. A. Pringle
by J. W. Anderson
Attorney.

Aug. 23, 1938.  J. F. SHEPPARD ET AL  2,127,704

STRIP FEED MECHANISM FOR RECORD MACHINES

Filed April 4, 1935   5 Sheets-Sheet 4

Inventors
J. F. Sheppard,
C. J. Manuel,
W. A. Pringle,
by  Anderson
Attorney.

Aug. 23, 1938.   J. F. SHEPPARD ET AL   2,127,704
STRIP FEED MECHANISM FOR RECORD MACHINES
Filed April 4, 1935    5 Sheets-Sheet 5
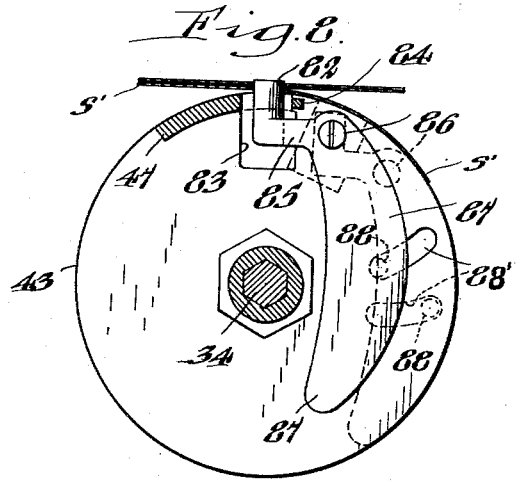
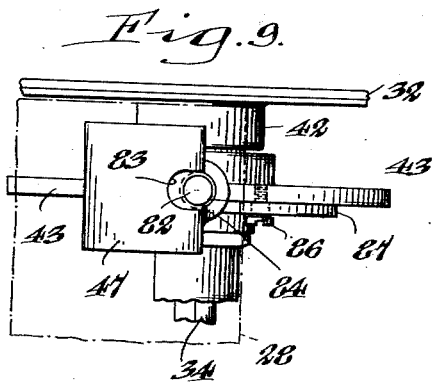
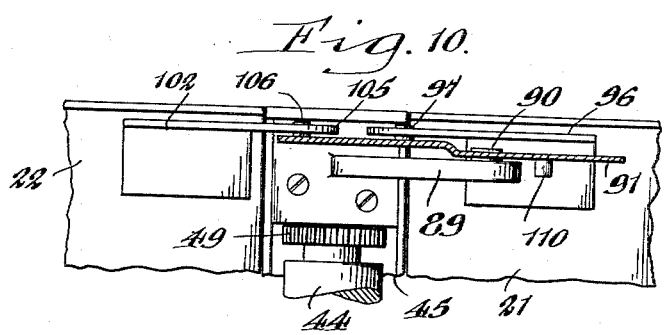
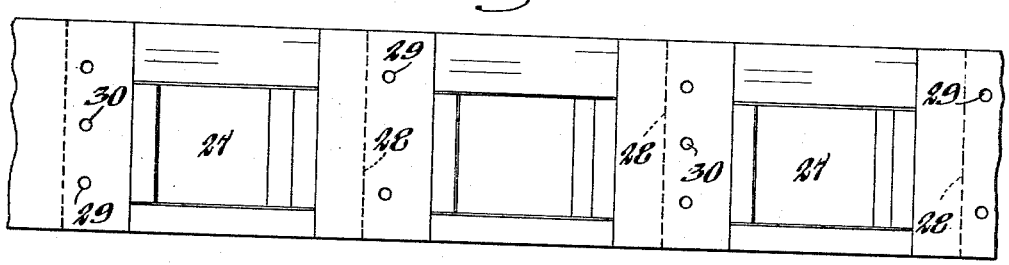

Patented Aug. 23, 1938

2,127,704

UNITED STATES PATENT OFFICE 2,127,704

STRIP FEED MECHANISM FOR RECORD MACHINES

Joel F. Sheppard and Charles J. Manuel, Dover, N. H., and William A. Pringle, Niagara Falls, N. Y., assignors to American Sales Book Company, Inc., Niagara Falls, N. Y., a corporation of Delaware Application April 4, 1935, Serial No. 14,664

27 Claims. (Cl. 271—2.4)

This invention relates to improvements in strip feeding mechanism for accomplishment of the feeding of strips for various purposes, but being particularly adapted and designed for effecting feed of record and similar strips in various forms of writing machines so as to bring said strips into alignment with a writing surface or platen.

It is a general object of the invention to provide a feeding mechanism of improved construction and arrangement designed to promote the smooth and accurate feeding of the strips, while being simple in construction and operation.

A further object of the invention is to provide in machines of the class mentioned, an improved record strip feeding mechanism whereby the record strips are fed forwardly in the machine following each transfer inscription, and are at all times maintained in flat smooth position over the writing platen, wrinkling of the strips and slack therein being effectually eliminated, so as to promote the formation of clear legible transfer inscriptions.

Still another object of the invention is to provide in machines of the class mentioned, an improved slack takeup device embodied in the strip feed mechanism so as to minimize slack of the record strips at parts thereof overlying the writing platen when the inscriptions are being made.

According to another feature of the invention an improved strip feeding mechanism is provided whereby the record strips are fed forwardly through the larger part of a record form length at a main operative feed cycle, and a supplemental feed cycle advancing the strips for a shorter space takes effect just before the termination of strip feed, so as to take up strip slack.

A further object is to provide in machines of the class mentioned, a reciprocating feed actuator designed to effect by movement thereof in one direction, actuation of the strip feed elements in the main operative cycle thereof, whereas movement of the actuator in the opposite direction effects the supplemental or slack feed cycle.

Another feature of improvement of the invention is the provision of an effective locking means for locking the strip feed elements in position at the termination of the main strip feed cycle and also at the termination of the supplemental feed cycle, and the provision of an improved mechanism for checking the feeding movement of the feed elements at the termination of the main feed cycle prior to locking actuation of the first mentioned locking means.

A further object is to provide in machines of the class mentioned, a locking mechanism of the pawl and ratchet type for the strip feeding elements, embodying an improved simple and practical construction whereby rattling or chattering is effectively avoided without at the same time interfering with the effectiveness of the lock.

Another object of the invention is to provide in machines of the class mentioned, an improved friction grip disk strip feed provided with an improved arrangement of a strip positioning pin mounted upon one or more of the feed disks and being gravity actuated to cause movements thereof toward and away from operative position.

Still another object of the invention is to provide in machines of the class mentioned, an improved assembly of the strip feeding and controlling unit whereby the latter may be readily installed as a unitary assembly into the casing or housing of the machine, and similarly removed therefrom, thus greatly facilitating installation and adjustments.

Other objects of the invention will be in part pointed out in the following detailed description of certain illustrative but preferred embodiments of the invention, and will be in part obvious in connection therewith.

The invention accordingly comprises the features of construction, combinations of elements and arrangement of parts which will be exemplified in the construction hereinafter set forth, and the scope of the application of which will be indicated in the claims.

For a more comprehensive understanding of the nature and objects of the invention reference should be had to the following detailed description of the illustrative preferred embodiments referred to, and to the accompanying drawings, in which.

Fig. 1 is a perspective view of an autographic register embodying the improvements of the invention, the covers being partially opened.

Fig. 2 is a longitudinal vertical section of the register shown in Fig. 1, parts of the inner mechanism being shown in elevation.

Fig. 3 is a fragmentary longitudinal vertical sectional elevation showing details of the mounting of the forward and rearward covers, and of the feed roll carrier or housing.

Fig. 8 is an enlarged side elevation of one of the friction feed disks showing the strip controlling pin mounted thereon.

Fig. 9 is a top plan view of the structure shown in Fig. 8.

Fig. 10 is a fragmentary inverted plan view, parts being removed and other parts in section, substantially on the line 10—10 of Fig. 3 looking in the direction of the arrows and showing details of the mounting of the forward and rearward covers.

Fig. 11 is a fragmentary elevation of a locking mechanism for the strip feed device.

Fig. 12 is a fragmentary section taken substantially on the line 12—12 of Fig. 11.

Fig. 13 is an enlarged perspective view showing the locking pawl in inverted position.

Fig. 14 is a detailed sectional perspective view of the hand rest.

Fig. 15 is a plan view of a fragment of the record strip which is utilized for filing in the machine compartment after inscription thereof.

Figure 4:
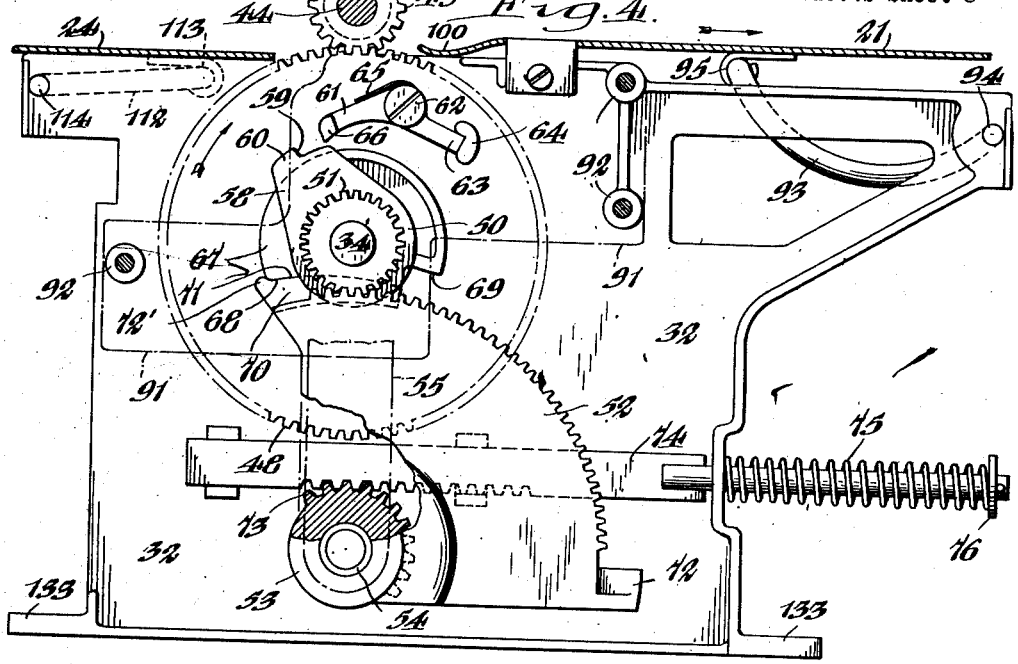
Fig. 4 is a fragmentary enlarged longitudinal vertical section of the machine, showing in elevation parts of the record strip feeding mechanism.

Referring to the drawings for a detailed description of the illustrative embodiment, a machine of the autographic register type is shown having a casing 20 provided with bottom, side and end walls and having a forward or front cover plate 21 and a rearward cover plate 22. The rear cover plate provides a margin frame and is formed with an opening 23 through which inscription entries may be made upon the record strips exposed through said opening. Underlying the cover plate 22 is the platen or platen plate 24 which is formed by a flat plate preferably of metal and is of novel structure and specially mounted on the machine as later fully described. The casing is also preferably constructed of sheet material, such as sheet metal, and an inwardly turned flange 25 extends around the upper edges of the end and side walls, providing a reenforcement. For convenience in the description, the right end of the machine, as shown in Fig. 1, is regarded as the forward end, while the rearward end is at the left in the same figure.

As shown in Fig. 2, the casing has a rearwardly disposed interior compartment for housing and supporting the record supply. While different forms of record supply may be used, it is preferred to employ a flat pad or packet S formed by reversely folding the record strips S' in zigzag form. This supply pad, on account of its compactness and shape, has advantages over other forms of supply and the machine disclosed is well adapted for using this form of supply.

There may be as many record strips as desired arranged in superposed manifolding relation with each other, and led from the supply compartment into writing position upon the platen 24. Each record strip will be provided with appropriate blank forms 27 spaced therealong and with weakened severance lines 28 dividing it into a series of form sheets, each provided with one of the blank forms. Also, each record strip is provided with feed-controlling apertures 29 arranged in one or more longitudinal series in the strip and preferably formed near one end of each of the form sheets. The record strip shown in Fig. 15 is also provided with filing or fold-directing apertures 30 arranged in a series therealong and positioned only in alternate form sheets. The other record strips are ordinarily the same as that shown in Fig. 15 with the exception that the fold-directing apertures are omitted from all of the strips excepting the lower one which is used for filing in a secret locked compartment of the machine maintained inaccessible to unauthorized persons. This filing compartment, as shown in Fig. 2, is at the forward end of the machine and the file strip S' is shown as folded therein in a zigzag file packet $S^2$.

Within the casing at the rearward part thereof are upstanding partition plates 31 attached to the casing bottom and providing side walls and a front end wall for the supply housing compartment. The rear end of the compartment may be left open, as shown, through which the record strips emerge in their passage to the platen. The side walls 31 of this compartment also provide supports for the platen 24, the rearward end portion thereof normally resting upon the upper edges of these plates, as shown in Fig. 2.

Figure 6:
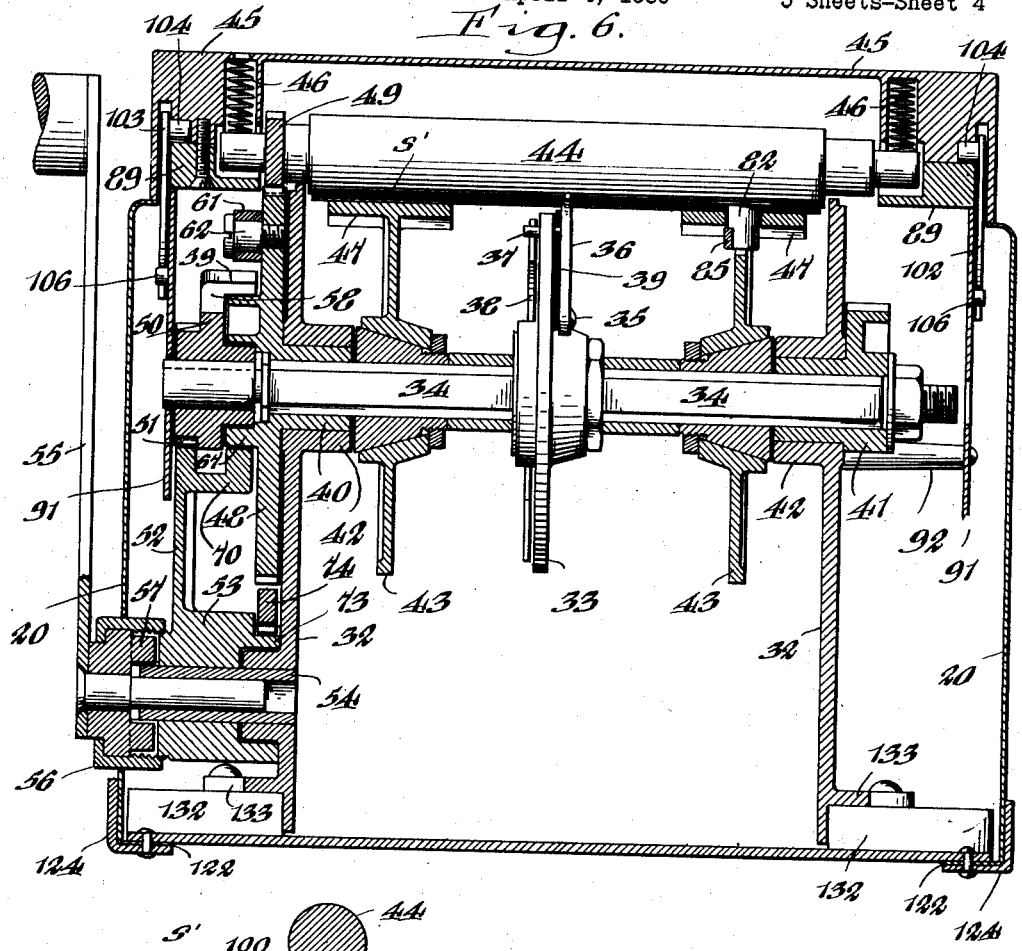
Fig. 6 is a transverse vertical section of the machine taken at the plane of the main feed shaft, showing in detail certain features of the construction of the record strip feeding elements and of the driving mechanism therefor.

Strip-feeding mechanism is housed within the casing, and as shown in Fig. 6, is mounted in a unitary frame 32 preferably having laterally spaced frame members in which the elements of feed mechanism are mounted. The unitary frame, as later more fully described, is constructed and arranged to be inserted in the casing as a unit, together with the feed mechanism and certain other elements, and similarly removed therefrom.

Figure 7:
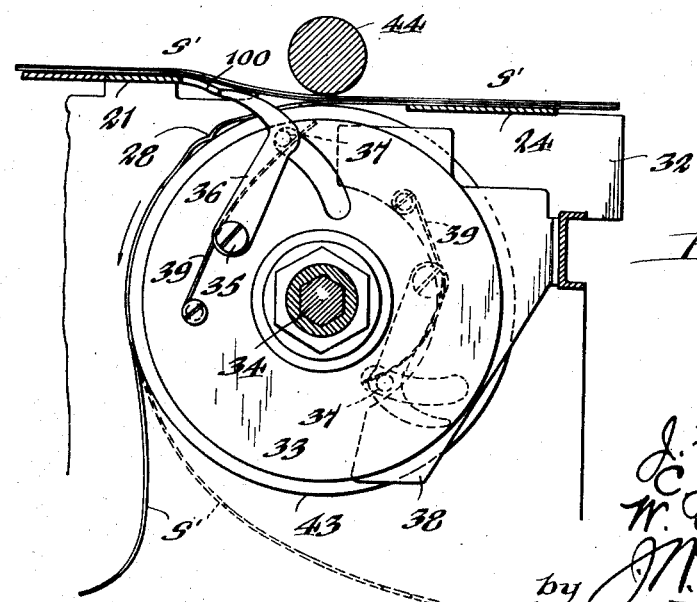
Fig. 7 is a fragmentary enlarged sectional elevation showing details of the strip feeding mechanism and of the strip folding mechanism for filing one of the record strips into a housing compartment therefor.

The file strip S' is directed and folded within the file compartment by means of a mechanism associated with the strip feed. As shown in Figs. 2, 6 and 7, this filing apparatus includes a circular disk 33 secured in position upon the main feed shaft 34 so as to rotate therewith. Pivoted at 35 upon this disk is a folding finger or hook 36 having a controlling lug or pin 37 running in a slot in the disk and controlled by a cam plate 38 attached to the frame. A spring 39 is normally biased to urge the folding finger into projected position. As the feed shaft 34 rotates, carrying with it the disk 33, the folding finger is automatically controlled by the cam into retracted position, as shown in dotted lines in Fig. 7, and into projected position, as shown in full lines, so as to enter at intervals into the fold-directing apertures 30, thus moving the file strip into folded position in the file pad $S^2$. Since the strip-folding mechanism and the operation thereof are generally set forth in the Johnston Patent No. 1,658,127 issued February 7, 1928, further description herein is deemed unnecessary.

Figure 5:
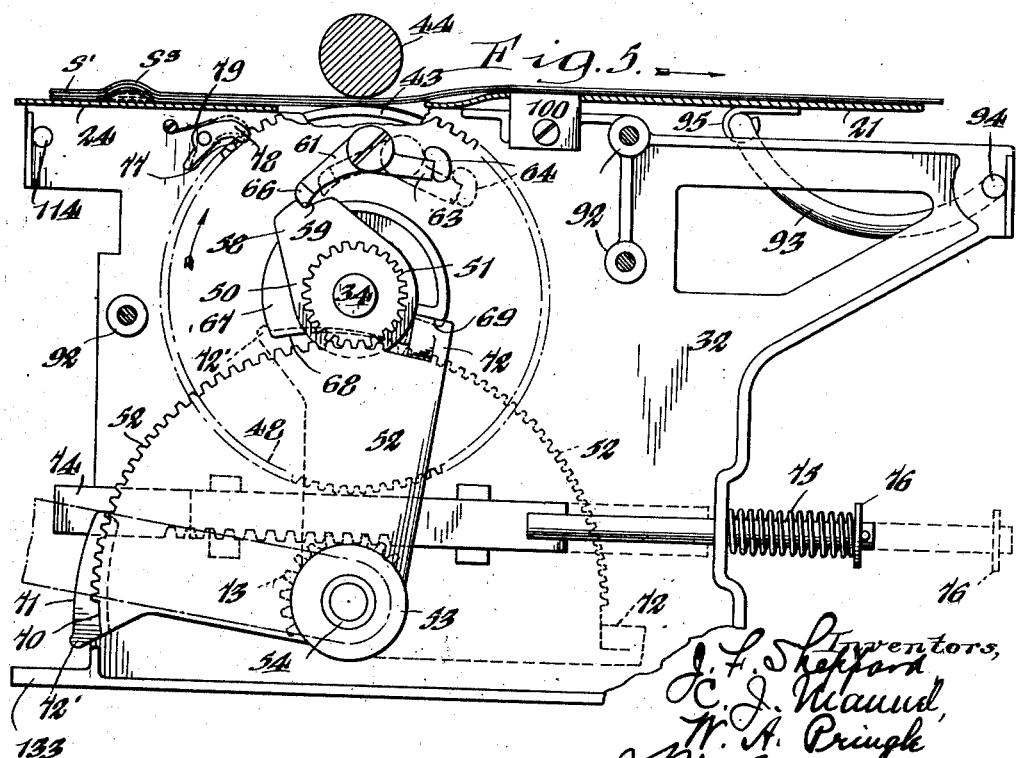
Fig. 5 is a view similar to Fig. 4 but showing the operating mechanism in a different position.

As mentioned above, the strip-feeding mechanism is mounted in a supporting frame to form a strip-feeding unit. The details of the illustrative embodiment of this feeding device are best shown in Figs. 4, 5 and 6. The main feed shaft 34 which is preferably hexagonal, or of the other non-circular form in cross-section, is rotatably mounted in the frame 32 by means of bearings 40 and 41 mounted upon the shaft and rotatably engaging in bearing hubs 42 formed in the side frame members. Strip-feed friction disks 43 are fixed upon the feed shaft so as to rotate with the latter, having their circular peripheries in friction-gripping relation with a feed roll 44 rotatably mounted in a carrier 45 which also serves as a housing for the feed roll. Springs 46 are mounted in the housing normally yieldingly urging the feed roll toward the feed disks so as to yieldingly grip the record strips between the roll and disks.

Strip-starting lugs 47 are formed at the peripheries of the feed disks, having strip-gripping surfaces positioned laterally of the disk peripheries and substantially forming extensions of the latter so as to grip the strips against the feed roll out of alignment with the feed-controlling apertures 29. It will thus be seen that rotation of the feed disks will cause the strips to be fed forwardly until the disk peripheries engage in the feed-controlling apertures 29, whereupon strip-feed will be checked and the strips aligned, as fully set forth in detail in the Johnston patent referred to. Starting of the strips after this checking and aligning action will be accomplished by the action of the friction grip feed-starting lugs 47.

Mounted upon the drive shaft 34, and preferably made integral with the bearing 40 thereof, is a toothed driving element or gear 48 having its teeth in driving engagement with a pinion 49 connected to the feed roll 44. Rotatably mounted upon the projecting end of the feed shaft 34 is a feed drive element 50 having a pinion 51 integrally formed therewith or otherwise attached thereto and having its teeth in driven engagement with the teeth of a feed actuator 52, which is shown in the form of a sector having a supporting hub 53 rotatably mounted upon a stub shaft 54 rigidly mounted in the frame. A main operating handle 55 of the swinging or oscillating lever type is rigidly connected to the hub 53 by means of a threaded sleeve nut 56 and by lugs 57 attached to the lever and engaging corresponding lugs formed on the hub.

The rotary driving element 50 has a short, radially disposed driving arm 58 formed at its outer end with a driving shoulder or notch 59, adjacent to and at one side of which is a pawl lifter cam or element 60 positioned for engagement in lifting relation with a driving pawl 61 pivoted at 62 to the driving gear 48. This pawl is provided with a load-transmitting extension or pawl arm 63 integral with the pawl and engaging a seat in a lug 64 formed upon the driving gear 48. This extension engages the lug so as to carry a part of the driving load which is transmitted through the driving pawl. A spring 65 is stressed to urge the pawl into its normal operative position, as shown in Fig. 4, but the pawl may swing in a clockwise direction away from this position. The free swinging end of the pawl is provided with an enlargement 66 normally positioned for engagement with the seat 59 for transmitting driving effort from the driving arm 58 to the pawl for operating the feed mechanism.

Integrally formed with the driving gear 48 or otherwise attached thereto is a feed-controlling cam follower element 67 substantially sector-shaped, having a circular surface underlying the path of movement of the driving shoulder 59, and also having an oppositely disposed, concave cam surface 68 formed at its under side as shown in Figs. 4 and 5. The cam element or block 67 is also formed adjacent to one end of the cam surface 68 with a projection or seat 69 cooperating to provide a stop for checking rotation of the feed mechanism as later described.

Integrally or otherwise attached to the driving actuator 52 is a cam element 70 having a convex cam surface 71, which is substantially complementary with the concave cam surface 68 of the cam or follower element 67. At the opposite extremity of the actuator sector 52 from the cam 70 is attached a pawl or stop element 72 positioned for engagement with the stop lug 69 when the sector is in a certain position. Also a projection 72' is found at one extremity of the cam surface 71 so as to engage with the cam follower 67 to check the actuator in its initial position.

The hub 53 of the actuator element is formed at its inner extremity with teeth to provide a driving pinion 73 cooperating with the teeth of a longitudinally reciprocating rack bar 74 slidably mounted in the frame and provided at one end thereof with a spring 75 confined between the frame and a washer 76 attached to an extension of the rack bar. This spring is compressed when the feed actuator is moved forwardly to operate the feeding mechanism in strip-feeding direction, and is thus energized to provide a motor for effecting return movement of the feed mechanism to initial position after a manual feed actuation thereof.

As best shown in Figs. 5, 11, 12 and 13, the main driving gear 48 is formed with a mutilated tooth 77 formed by cutting away a portion of the outer side thereof so as to provide a notch. In the embodiment disclosed, all of the other teeth of the driving gear 48 are regularly formed. A locking pawl 78 is pivotally mounted upon the frame, being urged by a stressed spring 79 into engagement with the teeth of the gear 48. The pawl 78 is formed with a locking nose or edge 80 adapted to enter between the teeth of the wheel 48 so as to engage in locking relation therewith. At one side adjacent to the locking nose 80, the pawl is formed with a cam element 81 extending longitudinally of the pawl for a short distance from the locking nose. This cam may be variously positioned upon the pawl, but it is proportioned and arranged so that it will not enter between two adjacent normally formed teeth of the wheel 48. In other words, the cam will be proportioned and positioned so that it will rest upon the end of a normally formed tooth when the locking nose 80 is in alignment between two adjacent teeth. By means of this structure, the pawl, as it rides over the tops of the moving teeth, is prevented from entering between any two adjacent teeth until the mutilated tooth comes along and is positioned in alignment with the cam element 81, whereupon the pawl is permitted to enter into locking relation with a tooth.

It will be understood that the pawl is designed to lock the wheel 48 only against movement in a rearward direction, whereas movement of the wheel forwardly in strip-feeding direction will not be obstructed by action of the pawl. During such forward movement of the wheel 48, the locking nose of the pawl will ride over the teeth, but chattering or rattling, which would be present in ordinary structures, will be effectively avoided by this improved structure, due to the fact that the cam 81 rides smoothly over the tops of the teeth, substantially avoiding oscillatory movement of the pawl. Since in the present structure it is desired to lock the feeding mechanism against retrograde movement only at one point of the rotary position of the feed shaft, it is sufficient for the present purposes to provide only one mutilated tooth 77. Additional mutilated teeth could be provided under conditions requiring locking action in different rotary positions of the feed shaft. As herein disclosed, the locking action of the pawl 78 takes place only at the end of the main feeding stroke of the operating handle 55, as shown in full lines in Fig. 5, at which position the feed shaft is locked by the pawl against retrograde rotation.

In the embodiment of the pawl structure shown, the cam element 81 merges with the locking nose 80, which also forms a part or extension of the cam, but it will be understood that the cam element may be spaced from the nose if desired. Furthermore, the mutilated tooth may be spaced the distance of one or more tooth spacings from the tooth which is to cooperate in locking relation with the pawl, the cam then being positioned so as to cooperate with the mutilated tooth when the pawl nose is in locking position.

Referring particularly to Figs. 6, 8 and 9, it will be seen that a strip-controlling pin 82 is attached to one of the feed disks 43 so as to be projected from the disk periphery or to be retracted into inoperative position. While one of the pins 82 may be mounted on each of the feed disks 43, it is shown herein as being provided only upon one of the disks. In order to provide clearance for the movable pin 82, the disk is cut away at a short space of its periphery to form an aperture 83 shown as positioned substantially at the forward terminal of the feed-starting lug 47. The section of this lug shown in Fig. 8 is substantially coincident with the plane of the near face of the feed disk, thus showing the integral extension 84 of the starting lug extending forwardly of the pin and merging with the disk.

Attached to the pin 82 and extending at an angle thereto is a pin-supporting arm 85 pivoted by a pin 86 to the disk. The arm 85 has an extension 87 continued beyond the pivot point 86 and providing a weight which is for the purpose of operating the pin by gravity incident to rotation of the feed disk in its feeding movements. The arm extension or weight 87 has a limiting pin 88 attached thereto and running in a slot 88' in the disk. When the pin is retracted and the weighted extension is swung outwardly to the dotted line position of Fig. 8, the pin 88 engages the outer terminal of the slot 88'. In this position the outer curved edge of the weight 87 is substantially coincident with the friction peripheral disk surface extended.

When the pin 82 moves into its uppermost position, due to disk rotation, the weighted extension 87 then becomes active to project the pin from the disk periphery and into the path of the record strips, as clearly seen in Fig. 8. When the disk is stopped in this position, the pin is urged into its projected operative position, and is held in such position by the weight 87. In this projected position, the pin can now be utilized for correctly positioning the strips when the latter are loaded into operative position in the feeding mechanism. For this purpose, one of the apertures 29 of each record strip may be threaded over the projected pin, thus definitely positioning the strip in correct relation with reference to the feeding mechanism, both longitudinally and laterally of the strip.

Upon initiation of disk rotation in strip-feeding direction, which is clockwise in Fig. 8, the pin is retracted by operation of the weight 87 as the parts approach the dotted line position of Fig. 8. In other words, the pin is retracted from projected position almost immediately as soon as the disk begins its forward rotation from the full line position shown. The pin is thus quickly withdrawn from the strip apertures so as to avoid any influence upon strip movement when the strip-feeding action of the disk begins.

It will be noticed that the starting lug 47 is operative to start strip-feed at the moment that the strip-controlling and positioning pin 82 is being moved into its retracted position.

As mentioned above, the front casing cover 21, the rear cover 22, and the platen 24 are all attached to the frame 32 in which the feeding mechanism is mounted, and the feed roll carrier or housing 45 is also attached to the frame. This structure is best shown in Figs. 2, 3, 6 and 10.

For the purpose of mounting the feed roll carrier, whereby the feed roll may be set into operative position for feeding the strips, and whereby it may be moved to open the strip-feeding grip upon the strips, a special novel and advantageous structure has been devised. As herein shown, there is attached to each of the opposite ends of the roll carrier a carrier supporting arm 89 each extending forwardly of the frame a short distance from the carrier and being pivoted to the frame by a pivotal mounting 90. The upper surfaces of each of these supporting arms 89 lie substantially flush with the under surface of the cover plate 21 whereby said plate, when in closed position, engages the arms so as to hold the roll carrier in its closed or operative position.

Metallic supporting plates 91 are provided for the purpose of supporting the feed roll carrier and covers upon the frame, one such plate being spaced outwardly a short distance from each side of the main supporting frame 32 and being supported by said frame by means of supporting studs 92 which may be arranged in any appropriate manner, either being integral with the frame 32 or otherwise appropriately attached thereto. The supporting arms for the roll carrier are thus pivoted through the pivotal supports 90 anchored in these opposite supporting plates 91.

Cover supporting links 93 are pivoted at the lower or inner ends thereof, as at 94, to the frame 32 and are pivoted at their outer ends, as at 95, to brackets attached to the inner surface of the cover 21. The upper or cover-attached ends of the mounting links 93 are preferably rigidly connected together, this being accomplished in the embodiment shown by means of a bar extending between the upper ends of the links and formed integrally with the latter. Both links 93 are thus constrained to move in unison and lateral or twisting movements of the cover are avoided. When the cover is in closed position, as shown in Fig. 2, it will be noticed that the pivotal connections of the links 93 with the frame are positioned forwardly of the pivotal connections 95 with the cover. This mounting provides for a wide translating movement of the cover in its opening direction, whereby the cover may be moved completely to non-obstructing position with the opening leading to the filing compartment.

At or near its rearward end, the cover 21 is provided with downwardly depending brackets 96 forming cover-locking lugs having upper edge surfaces engageable with locking studs 97 mounted in the supporting plates 91. (See Figs. 3 and 10.) Thus, it will be seen that when the cover 21 is moved into position to close the file compartment, it is translated bodily in a rearward direction, the locking or retaining lugs 96 engaging beneath the studs 97 so as to hold the cover securely against upward movement. In this position, the rearward edge of the cover engages with the upper surfaces of the housing supporting arms 89, thus maintaining the roll housing in its closed operative position.

Mounted at the forward end of the cover 21 and projecting from the inner surface thereof, is a lock 98 having a swinging locking bolt 99 positioned for engagement with a shoulder on the inner surface of the adjacent end wall of the casing. A key may be inserted into the lock from the outside of the cover for swinging the locking bolt 99 into locking or releasing positions. In this manner the cover 21 may be securely locked in closed position against unauthorized access to the strip file compartment. The inscribed file-strip may thus be preserved indefinitely as required against unauthorized tampering. It will be noticed, furthermore, that the roll housing will be locked in closed position by locking of the cover, thus preventing tampering of the file strip by way of the feed mechanism which might otherwise be done by raising the roll housing.

Attached to the frame 32 (see Figs. 1 and 4) is a strip deflector plate 100 having its forward edge positioned close to the exit point of the strip-feed mechanism, whereby strips placed above said plate are issued outside of the casing upon the cover 21, whereas the file strip is entered beneath said deflector plate and is projected into the filing housing and filed into folded position by the folding mechanism above described. This deflector plate is normally seated within a recess 101 formed at the rearward edge of the cover 21, thus preserving the upper surface of the casing in a smooth and continuous condition.

It will be noted that the roll carrier 45 and forward cover 21 are mounted upon the interior supporting frame and are free from any direct supporting connection with the outer casing or housing. The rear cover plate 22 similarly has its supporting connection with the interior frame 32. This mounting of the cover 22, as best seen in Figs. 3, 6 and 10, is formed through brackets 102 attached to the lower face of the forward end of the cover, and each being provided with a supporting arm 103 extending upwardly and pivotally attached at 104 to the adjacent end of the roll housing. The supporting arms 103 are positioned just forwardly of the cover 22 whereby the cover may be swung upwardly from its closed position upon the pivots 104. Each of the brackets 102 has a downwardly disposed hooked extension 105 providing a latch or lock engageable with an adjacent locking lug 106 anchored in the corresponding frame member or supporting plate 91. Thus when the cover is swung downwardly on its supporting pivot 104, the latches 105 engage with the lugs 106, thus not only locking the cover firmly in its closed position, but at the same time securing the roll housing 45 in its operative position, and supplementing the forward holding device 96 above described.

Both cover plates 21 and 22 in their closed positions, as shown in Figs. 1 and 3, rest upon the upper edges of the end and side walls of the casing, preferably as shown having down-turned marginal flanges positioned for engagement with the casing and being substantially flush with the outer surfaces thereof.

At or near its rearward terminal, the cover plate 22 carries a latching plate 107 attached to the inner face thereof, cooperating with a latch lever 108 pivotally mounted on the end wall of the casing and normally urged by a spring into latching engagement with the plate 107 so as to retain the cover in closed position. The latch lever 108 may be manually released by pressure upon an operating button 109 projecting through an aperture in the rear casing wall.

As shown in Figs. 3 and 10, stop lugs 110 are mounted upon the frame plates 91 adjacent to the forward ends of the housing supporting arm 89. Also, each supporting arm has a shoulder 111 positioned for engagement with the lug 110 when the roll housing is pivotally swung upwardly into position to open the feeding grip. In this manner the upward swinging movement of the roll housing is limited by engagement of the shoulders 111 against the stop lugs 110 and the roll housing thus supported in its raised position.

The platen plate 24 is also directly movably attached to the frame 32 for movements relatively to the latter in a manner similar to the mountings of the forward and rearward covers and of the roll housing 45. In the present embodiment, as best shown in Figs. 1 and 2, this platen connection includes supporting links 112 pivotally connected to the under side of the forward end of the platen, as by brackets 113, and being pivotally connected at their opposite ends at 114 to the rearward part of the frame 32. Two of these supporting links 112 are rigidly connected together by a bar extending transversely of the under side of the platen plate. As shown, this rigid connection is conveniently formed by bending the ends of a metallic bar substantially at right angles to the connecting bar which is attached to the cover by the brackets 113. At its forward end the platen plate rests upon the upper edge of the frame members 32 (see Fig. 2) so as to support the platen at this end in its operative position, in which the links 112 extend rearwardly from the brackets 113. This link connection provides for rearward translatory movement of the platen from its operative position.

Toward its rearward part, the platen plate is deflected or bent downwardly to provide a flange or vertical wall 115. This deflected portion of the plate is bent rearwardly to form the lower wall 116 which may be rounded at its rearward end to provide a smooth guiding surface for the record strips in their passage to the platen from the supply compartment. These bent or offset plates 115, 116 provide a recess or seat in which a strip-tensioning and smoothing device 117 is mounted. While the strip-tensioning device may be of different preferred types of construction, that shown is especially effective embodying longitudinal frame members pivotally mounted upon the platen structure at 118 so as to be swung upwardly into strip-loading position from the normal operative posititon shown in Fig. 2. Strip-guiding plates 119 extend transversely between the longitudinal side frame members being curved as shown to provide smooth guiding surfaces for the advancing strips, one strip passing over and being guided by each bar 119. Resilient strip-engaging members 120 engage with the respective guide bars so as to exert a frictional guiding and smoothing action upon the strips. The resilient strip-controlling members 120 are preferably in the form of filamentary bundles of bristles or the like mounted in supporting bars 121 which are preferably mounted in the frame for movement so as to vary the strip-tensioning action.

In its operative position, as shown in Fig. 2, the downwardly offset plate 116 rests upon the upper edges of the supply housing walls 31 so as to support the rearward end of the platen structure in its normal operative position.

As best shown in Figs. 2 and 6, the lower edge portions of the end and side walls of the casing are inwardly turned or flanged to form supporting flanges 122 and 123 engaging under the bottom plate of the casing which may be of slightly heavier metallic plate than the side and end walls. Outer supporting and rigidifying angle bars 124 overlap the lower edges of the end and side walls and the outer edges of the bottom plate, both the vertical and horizontal flanges of the angle bar being attached to the casing plates by riveting, spot welding, or by other preferred connecting means. The angle bars, as shown in Fig. 1, are preferably bent at the corners of the casing, terminating at the casing ends adjacent to rigidifying and finishing end frame members 125. These end frame members are preferably of somewhat heavier material than the casing walls and the adjacent ends of the casing plates are attached thereto in any appropriate manner, such as by screws, bolts, rivets or spot welding. The cover latch 108 is mounted upon the rearward end frame member 125. The ends of the angle bars 124 overlap the end frame members 125 to which they are preferably secured. This structure provides a light but relatively rigid casing for the machine which is neat in appearance and inexpensive in production costs.

As best shown in Figs. 1 and 14, a hand or arm rest 126 of appropriate size and proportions is mounted at one side of the casing near the writing opening 23 in the cover plate 22, and functioning as a guide and support for the operator's hand during entry of inscriptions. This hand rest has an upper marginally flanged plate 127 with its upper surface substantially flush with the top surface of the cover plate and being supported by a bracket plate 128 welded or otherwise attached to the top plate and extending downwardly along the outer face of the casing, and preferably having cushioning pads attached to its surface and bearing against the casing. Attached at the upper part of the supporting bracket are one or more metallic supporting clips 129, each having a downturned flange adapted to engage or hook over the inwardly turned flange 25 of the casing. Also, the bracket is provided with an additional supporting clip 130 spaced from the others and having an upwardly directed terminal flange positioned for engaging or hooking over the downturned marginal flange of the cover 22 when the latter is in closed position.

When the cover is raised, the hand rest is not disturbed but the cover flange moves from engaging position with the supporting clip 130, whereupon the other supporting clips alone form the support for the bracket. When the cover is thus raised, the hand rest may be readily adjusted from one position to another or from one side of the register casing to the other side thereof, the adjustment or detachment being quickly and easily accomplished by simple movements of the rest. When the cover is closed, the engagement of the cover flange with the upwardly directed flange of the supporting clip 130 not only locks the arm rest in position, but functions to reenforce and brace the rest in its attached position. Thus a bracket of simple but effective structure is formed which is readily attached or detached from the machine or adjusted thereon, and at the same time is relatively inexpensive to manufacture.

As previously mentioned, the main frame for supporting the operative mechanism is of a unitary structure adapted to be bodily inserted in housed position within the casing, and similarly removed therefrom. It will now be seen that the casing structure may be relatively light since the operative elements are not directly mounted therein. It may be said that in one sense the casing is supported by the main frame rather than providing a support for the latter. It will be seen, furthermore, that the cover elements 21, 22 and the platen element 24 may be removed from the casing as a unit together with the main operating frame 32 to which they are attached. Assembly and disassembly of the parts are thus greatly facilitated, and inspection of the various elements made easy. While two main frame side elements 32 are herein disclosed, this structure may be varied while preserving its unitary nature. Structural cross frame members 131 extend between the side frame members 32 being attached to the latter and functioning to brace and support the side frame members in spaced relation.

Supporting pads or blocks 132 are attached to the bottom casing plate within the casing and may be of any appropriate material, such as metal, wood, rubber, etc. The supporting blocks are attached in spaced relation to the bottom plate so as to align in supporting relation with supporting brackets 133 attached to the frame 32. The supporting blocks 132 are provided with threaded apertures whereby screws or bolts passing through the supporting brackets may be inserted for attaching the frame in operative position within the casing.

From the foregoing, it will be seen that frame units 32 of different sizes may be installed in the same standard casing, it being necessary only to properly space the supporting blocks 132 for accommodating the different sizes of frame units, and to provide cover plates 21 and 22 of appropriate size. Also, feeding mechanism for feeding different widths of record strips may be mounted in side frame members 32 of a given standard size, it being necessary for this purpose only to provide feed shafts of the appropriate length, and cross frame members 131 of appropriate length to support the side frame elements 32 with the required spacing.

It will be understood that an appropriate carbon or transfer strip supply will be provided for interleavement with the record strips over the writing platen 24. Such transfer strips, in so far as the present invention is concerned, may be supported in any desired or preferred manner. For example, a roll of transfer material may be supported at one longitudinal edge of the platen 24 within the casing, the carbon strip or strips being extensible from the roll supply across the platen and supported at the edge thereof opposite to the roll by an appropriate clamping means.

It will now be seen that the covers 21 and 22, the feed roll housing 45 and the platen 24 may be readily adjusted to different positions to facilitate handling and adjustments of the record and transfer strips and for threading said strips into operative position over the platen and into the feeding mechanism. When it is desired initially to load the record strip supply pad S into the compartment therefor, the cover 22 will first be raised by swinging it upwardly upon its pivotal mounting 104, the lock 98 having first been released and the cover 21 retracted from holding engagement with the roll supporting arms 89. During this initial swinging movement of the cover 22, the locking lugs 105 will be disengaged from the shoulders 106, thus releasing the roll carrier 45 to upward swinging movement. Upon continued swinging movement of the cover 22 in opening direction, the upper surface thereof will engage with the outer surface of the roll housing, whereupon the continued movement of the cover will cause the said housing to be swung upon its supporting arms 89 into position to open the strip-feeding grip between the peripheries of the feed disks 43 and the feed roll 44. This movement of the cover and roll housing is checked and the housing and cover supported in open position by engagement with the stops 110 of the supporting shoulders 111 formed on the housing supporting arms 89. It is to be observed that the cover 22 may be raised to expose the platen and record strips, even though the cover 21 remains in closed position, but in this case the roll housing may not be lifted because of the locking effect of the cover plate 21 above described. When the cover plate 22 alone has been opened as described, or when both cover plate and roll housing are opened, (see Fig. 3) the movement thereof in either case in a forward direction is sufficient to cause the center of gravity to pass forwardly beyond the pivotal point 104 or beyond the pivotal point 90, so that the cover, or the combined cover and roll housing are maintained in open position by gravity.

When the cover 22 has been raised as described, and whether or not the roll housing has also been raised, the platen 24 will be uncovered and rendered accessible, whereupon it may be raised at its rearward extremity so as to clear the casing walls and then translated rearwardly by virtue of the swinging action of the mounting links 112. The platen structure may then be allowed to rest upon the upper edge of the rear wall of the casing, whereupon the record strips S' can very easily be threaded into position in the strip-tensioning device 117, which may be swung upwardly on its pivotal support 118 in order further to facilitate the threading operation. This tensioning device may operate upon the broad principle disclosed in the Hagemann Patent No. 1,804,608.

Having been threaded through the strip-tensioning device, the record strips are then pulled forwardly over the writing platen and entered into the feed grip of the feeding mechanism. If the roll housing has been raised as described, the strip-feed grip is wide open and the feed mechanism rendered easily accessible, whereupon the apertures 29 at the forward ends of the strips may be threaded one at a time upon the pin 82, which at this time projects into the strip path. The record strips are thus guided and held in correct position both longitudinally and laterally thereof. At the same time, the lower or file strip may be entered beneath the deflector plate 109 so as to be directed and folded into the file compartment, while the remaining or upper strips are entered above said deflector plate to be issued outside of the front cover plate 21. The platen assembly 24 may be returned to its normal operative position either before or after threading of the strips over the pin. When the strips are thus threaded into position, the cover plate 22 may then be swung rearwardly into its closed position, and if the roll housing has been raised, it will at the same time be moved into its closed or operative position. As the cover 22 approaches its final closed position, the locking lugs or brackets 102 engage with the locking shoulders 106 to force the housing into its final closed position and to hold it against the compression of the roll springs 46. The friction feed grip upon the strips is thus established. If the roll carrier 45 has not been raised for threading the record strips into position, the feed grip will nevertheless be rendered easily accessible by reason of the fact that the platen plate 24 can be translated rearwardly away from the feeding mechanism as described.

When it is desired to open the file compartment cover 21, the lock 98 is released, whereupon the cover may be swung and translated forwardly by virtue of the mounting links 83. In this manner the cover has a wide range of movement so as to completely uncover the file compartment and to render the contents thereof freely accessible. It will be noted that the roll housing is held firmly in closed or operative position, even when the cover 21 is opened, by virtue of the action of the locking lugs 105 of the cover 22, as already described. In other words, each of the covers is adapted to control securing means for holding the roll housing in closed operative position and the roll is doubly secured in place. The locking bolt 99 of the cover 21 may be provided with a soft, resilient bumper for cushioning engagement thereof with the outer surface of the end wall casing when the cover is swung into open position.

When the strips have been loaded into the feeding mechanism as above described, the machine is ready for receiving inscription entries, and following the complete inscription of a set of form sheets the strip-feeding mechanism is operated as follows:

First the main operating lever 55 is moved from its initial position shown in Figs. 1, 4, and 6, into the dot and dash line position in Fig. 5. This actuation of the operating lever effects strip-feeding rotation of the feed disks 43 to feed the strips forwardly. The initial movement of the operting handle causes the driving shoulder 59 of the driving arm 58 to move into engagement with the driving pawl 61, thus transmitting rotary driving effort to the toothed wheel 48 and through this wheel through the drive shaft 34 to the feed disks. At the end of the forward stroke of the operating lever (see full lines in Fig. 5), the stop pawl 72 of the feed actuator is brought into position to be engaged by the stop shoulder or seat 69 of the cam follower element 67. This action of the stop pawl positively checks the feeding movement of the feed disks in a definite position. The part of the feed operation up to this point may be referred to as the main feed cycle because it advances the record strips through the greater part of a form-length, that is, the distance between adjacent transverse severance lines 28. It is at this moment when the stop pawl 72 becomes active to check the strip feed that the locking pawl 78, through its cooperation with the mutilated tooth 77 moves into locking position with the toothed wheel 48 to check retrograde movement of the main feed shaft 34. Said shaft is thus at this moment locked against feed movement by the pawl 72 and against rearward movement by the pawl 78.

At the end of the main feed cycle, the operating lever 55 is moved reversely into its initial position either by manual actuation of the operator or through the compressed spring 75 and the rack bar 74. This movement causes the driving arm 58 to rotate reversely or in counterclockwise direction as viewed in Fig. 5 through a little more than 360°. When the lifting cam 60 reaches the driving pawl 61 the latter is raised by actuation of the cam, whereupon the arm passes freely by and slightly beyond the pawl to its initial position, as shown in Fig. 4.

When the feed mechanism is stopped by actuation of the pawl 72, the forward feeding actuation of the strips has not been fully completed, but will be terminated when the operating lever 55 is reversely moved into its initial position by what is herein termed the supplementary feed cycle. As the operating lever moves reversely into its initial position, the actuator cam 70 approaches the concave cam surface 68 of the cam or follower element 67, which at this time occupies the position shown in full lines in Fig. 5. The convex cam surface 71, during this return movement, first engages with the left end of the convex surface 68 as viewed in Fig. 5, whereupon as the cam 70 moves into its final position, the cam follower 67, together with the feed shaft and feed disks, is moved forwardly for a short distance to complete the supplemental feed cycle and advance the strips into their final position. During this supplemental feeding action the movement is from the full line position of Fig. 5 to the dotted line position which is also the position as shown in Fig. 4. As the cam 70 moves into its final position in which it is shown in Fig. 4, the convex cam surface 71 moves into its final position in which it fully engages in the concave cam surface of the follower 67, thus effectually locking the feed shaft against either forward or rearward movement, as will be clear upon reference to Figs. 4 and 5.

One important advantage of the supplemental feed cycle as above described is to take up strip slack in the portions of the strip overlying the writing platen, and to cause said strips to lie flat and to be free from wrinkles or bulges in order that inscription entry may not be impeded and that the transfer inscriptions may be clear and legible. It will be observed that the main feed cycle, effected by quick movement of the operating lever 55, causes the strips to move forwardly very rapidly, and this feeding action is stopped quite abruptly by stop action of the pawl 72 as above described. Due to this fact, there is considerable tendency of the strips then in position over the platen due to this feeding action to become slightly bulged or wrinkled at parts thereof, as suggested in full lines at S³ in Fig. 5. This effect may be due to several causes, the principal of which is the inertia of the rapidly moving strips at the moment that the strip feed is stopped. The supplemental feeding action described is designed to fully take up the slack occasioned by the operations described as indicated in dotted lines in Fig. 5.

It will be noted that the supplemental feed cycle advances the strips a very short distance compared with the main feed cycle, and also that the velocity of strip feed for the supplemental cycle is materially less than the strip velocity at the main feed cycle. This lessened velocity is due in part to the construction of the cam surfaces 68 and 71, necessitating a large angular movement of the actuator 52 in order to move the feed shaft through a relatively small angle (as indicated by the full line and dotted line positions in Fig. 5) and is due in part to the slower return movement of the actuator 52 under the influence of the spring 75 which may be made sufficiently weak for this purpose. If the operating lever is moved reversely to initial position by the operator, decreased feed velocity at the supplemental cycle would be effected by the actuation brought about by engagement of the cam surfaces, as just mentioned.

When the inscribed record sheets have been fully fed forwardly over the cover 21 as described, they may be severed from the strips in any desired manner, as by severing them along the weakened lines 28 by exerting a tearing pull on the strips against the lower forward edge of the roll housing.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a machine of the character described, in combination, strip feeding mechanism, means for operating said feeding mechanism in a main feed cycle, means for operating the feeding mechanism in a supplemental feed cycle to advance the strip a shorter distance than at the main cycle to adjust strip slack, means whereby said second mentioned operating means operates the feeding mechanism at the supplemental cycle to feed the strip at a less velocity than at the main cycle, and a positive stop device cooperating with the feeding mechanism for terminating the main feed cycle before beginning the supplemental cycle.

2. In a machine of the character described, in combination, rotary strip feeding mechanism, means including a reciprocating actuator for operating said feed mechanism to effect main strip feed upon movement of said actuator in one direction, and interengaging driving and driven elements operatively connected to and driven by movement of said actuator in another direction for effecting supplemental strip feed for slack adjustment.

3. In a machine of the character described, in combination, rotary strip feeding mechanism, means including a reciprocating actuator for operating said feed mechanism to effect main strip feed upon movement of said actuator in one direction, supplemental feed means for effecting supplemental strip feed for slack adjustment by movement of said actuator in another direction, means controlled by said actuator for terminating said main strip feed in a predetermined position, and means whereby said supplemental feed means retains said feed mechanism against rotation in its final position at the end of the supplemental strip feed.

4. In a machine of the character described, in combination, rotary strip feeding mechanism, means including an actuator for operating said feed mechanism to effect strip feed, a cam operatively connected to said actuator, means operated by said cam to effect strip slack adjustment, and means whereby said cam retains said feeding means against rotation after a feeding operation.

5. In a machine of the character described, in combination, rotary strip feeding mechanism means including a rotary actuator for operating said feed mechanism to effect strip feed, a cam operatively connected to said actuator and having a convex cam surface, and a rotary cam follower operatively connected to said feeding mechanism and having a concave surface cooperating with said convex cam surface to effect strip slack adjustment.

6. In a machine of the character described, in combination, strip feeding mechanism, means for operating said feeding mechanism in a main feed cycle, means for operating the feeding mechanism in a supplemental feed cycle to advance the strip, means for locking the feeding mechanism in position only at the end of the main feed cycle, and means for locking the feeding mechanism in position only at the end of the supplemental feed cycle.

7. In a machine of the character described, in combination, strip feeding mechanism, means for operating said feeding mechanism in a main feed cycle, means for operating the feeding mechanism in a supplemental feed cycle to advance the strip, a toothed rotary wheel connected to said feeding mechanism and having a mutilated tooth, a locking pawl having a cam engaging with the wheel teeth to avoid undue rattling and cooperating with said mutilated tooth to provide for pawl movement into locking position.

8. In a machine of the character described, in combination, a rotary member including a toothed member, at least one of the teeth of which is mutilated, a locking pawl mounted for riding over the teeth of the toothed member and for engagement in locking relation with one of the teeth, said pawl having a cam riding over the tops of said teeth and of a peripheral length to prevent entry thereof between two adjacent teeth, and cooperating with said mutilated tooth to provide for pawl movement into locking position.

9. In a machine of the character described, in combination, a rotary strip feeding friction disk, a strip-controlling pin pivoted to said friction disk, and a gravity device connected to said pin and controlled by disk rotation to project said pin into operative position beyond the disk periphery at a predetermined period of disk rotation, and to retract it at other times.

10. In a machine of the character described, in combination, strip feeding mechanism, means for operating said feeding mechanism in a main feed cycle, means for operating the feeding mechanism in a supplemental feed cycle to advance the strip at a less velocity than at the main cycle, stop lugs for said first mentioned operating means to check feed operation of said feeding mechanism upon termination of the main feed cycle, and means whereby said supplemental operating means retains said feeding mechanism in its final position at the end of the supplemental cycle.

11. In a machine of the character described, in combination, rotary strip feeding mechanism, means including a reciprocating actuator for operating said feed mechanism to effect main strip feed by movement of said actuator in one direction, driving elements operatively connected to said actuator and driven by movement of the latter for effecting supplemental strip feed for slack adjustment by movement of said actuator in another direction, and means controlled by said actuator for terminating said main strip feed in a predetermined position.

12. In a machine of the character described, in combination, rotary strip feeding mechanism, means including a reciprocating actuator for operating said feed mechanism to effect main strip feed by movement of said actuator in one direction, supplemental feed means for effecting supplemental strip feed for slack adjustment by movement of said actuator in another direction, and means whereby said supplemental feed means retains said feed mechanism against rotation in its final position at the end of the supplemental strip feed.

13. In a machine of the character described, in combination, a rotary strip feeding mechanism, means including an actuator operatively connected for operating said feed mechanism to effect strip feed, a cam operatively connected to be driven by said actuator, and means operated by said cam when the latter is driven by said actuator to effect strip slack adjustment.

14. In a machine of the character described, in combination, rotary strip feeding mechanism, means including an actuator for operating said feed mechanism to effect strip feed, a cam operatively connected to said actuator, means operated by said cam to effect strip slack adjustment, means operated by said actuator to check said feeding mechanism prior to said slack adjustment, and means whereby said cam retains said feeding means against rotation after a feeding operation.

15. In a machine of the character described, in combination, rotary strip feeding mechanism, means including an actuator for operating said feed mechanism to effect strip feed, a cam operatively connected to be driven by said actuator, and a cam follower driven by said actuator through said cam and operatively connected to said feeding mechanism so as to effect strip slack adjustment and to hold said feeding mechanism against rotation after a feeding operation.

16. In a machine of the character described, in combination, rotary strip feeding mechanism, a reciprocating, rotary actuator for said feeding mechanism, a reciprocating rotary driving element having driving connection with said reciprocating actuator and including a driving shoulder and a pawl-lifting element, a driving pawl having a pivotal connection to said rotary feeding mechanism, and having its free driving end positioned adjacent to said reciprocating driving element so as to engage with said shoulder when rotated forwardly to drive the feeding mechanism forwardly, said pawl-lifting element being positioned to rock the pawl from the path of said shoulder when said driving element is reversely located, said pawl having a rearward extension, and a lug on said feeding mechanism positioned for engagement with said pawl extension to limit rocking of the pawl and to transmit forward driving effort to the feeding mechanism.

17. In a machine of the character described, in combination, rotary strip feeding mechanism, a reciprocating rotary actuator for said feeding mechanism, a reciprocating rotary driving element having driving connection with said reciprocating actuator and including a driving shoulder and a pawl-lifting element, and a driving pawl having a pivotal connection to said rotary feeding mechanism, and having its free driving end positioned adjacent to said reciprocating driving element so as to engage with said shoulder when rotated forwardly to drive the feeding mechanism forwardly, said pawl-lifting element being positioned to rock the pawl from the path of said shoulder when said driving element is reversely rotated, said pawl having a load-carrying connection to the feeding mechanism in addition to said pivotal connection for transmitting forward driving effort.

18. In a machine of the character described, in combination, strip feeding mechanism, means for operating said feeding mechanism in a main feed cycle, supplemental means for operating the feeding mechanism in a supplemental feed cycle to advance the strip, means for locking the feeding mechanism in position at the end of the main feed cycle, and means whereby said supplemental operating means retains said feeding mechanism in its final position at the end of the supplemental cycle.

19. In a machine of the character described, in combination, strip feeding mechanism, means for operating said feeding mechanism in a main feed cycle, means for operating the feeding mechanism in a supplemental feed cycle to advance the strip, a toothed rotary wheel connected to said feeding mechanism and having a mutilated tooth, a locking pawl having a cam engaging with the wheel teeth to avoid undue rattling and cooperating with said mutilated tooth to provide for pawl movement into locking position, and means whereby said supplemental operating means retains said feeding mechanism in its final position at the end of the supplemental cycle.

20. In a machine of the character described, in combination, strip feeding mechanism, means for operating said feeding mechanism in a main feed cycle, means for operating the feeding mechanism in a supplemental feed cycle to advance the strip, means for locking the feeding mechanism in position at the end of the main feed cycle, means for locking the feeding mechanism in position at the end of the supplemental feed cycle, and means whereby said first mentioned locking means is effective to lock the feeding mechanism only at the end of the main feed cycle.

21. In a machine of the character described, in combination, a rotary member including a toothed member, at least one of the teeth of which is mutilated, a locking pawl mounted for riding over the teeth of the toothed member and for engagement in locking relation with one of the teeth, said pawl having a cam riding over the tops of said teeth and positioned to engage with a tooth when the pawl is positioned for entry between two adjacent teeth so as to prevent undue chattering, said cam being positioned for cooperating with said mutilated tooth to provide for pawl movement into locking position.

22. In a machine of the character described, in combination, a rotary strip feeding friction disk, a strip-controlling pin pivoted to said friction disk, and a gravity device for projecting and retracting said pin in different rotative positions of the disk.

23. In a machine of the character described, in combination, a rotary strip feeding element, a strip controlling pin movably mounted upon said rotary feeding element for projection and retraction, and a gravity device connected to said pin and controlled by rotation of said feeding element to project said pin into operative position at a predetermined period of rotation of the rotary feeding element and to retract it at other times.

24. In a machine of the character described, in combination, a rotary strip feeding friction disk, a starting lug on said disk, a strip controlling pin movably mounted on said disk and positioned adjacent to said lug, and a gravity device connected to said pin and controlled by disk rotation to cause said pin to be projected into operative position beyond the disk periphery at the time said starting lug is approximately in strip starting position.

25. In a machine of the character described, in combination, a rotary strip feeding friction disk, a starting lug on said disk, a strip controlling pin movably mounted on said disk and positioned adjacent said lug, and a gravity device connected to said pin and controlled by disk rotation to cause said pin to be projected into operative position beyond the disk periphery at the time said starting lug is approximately in strip starting position, said gravity device being positioned to retract the pin upon initial movement of the lug from operative starting position.

26. In a machine of the character described in combination, a rotary strip feed mechanism, means including an actuator operatively connected for operating said feed mechanism to effect strip feed, a slack adjusting drive element operatively connected to be driven by said actuator, and means operated by said slack adjusting drive element when the latter is driven by said actuator to effect strip slack adjustment.

27. In a machine of the character described, in combination, strip feeding mechanism, means for operating said feeding mechanism in a main feed cycle, means for operating the feeding mechanism in a supplemental feed cycle to advance the strip and including cooperating rotary driving and driven cams, and a driving actuator for both said main and supplemental cycle operating means and having driving connection with said cams so as to drive the latter to effect strip movement at the supplemental cycle, said cams being shaped to feed the record strips slower at the supplemental cycle than at the main feed cycle.

JOEL F. SHEPPARD.
CHARLES J. MANUEL.
WILLIAM A. PRINGLE.